United States Patent Office 2,954,963
Patented Oct. 4, 1960

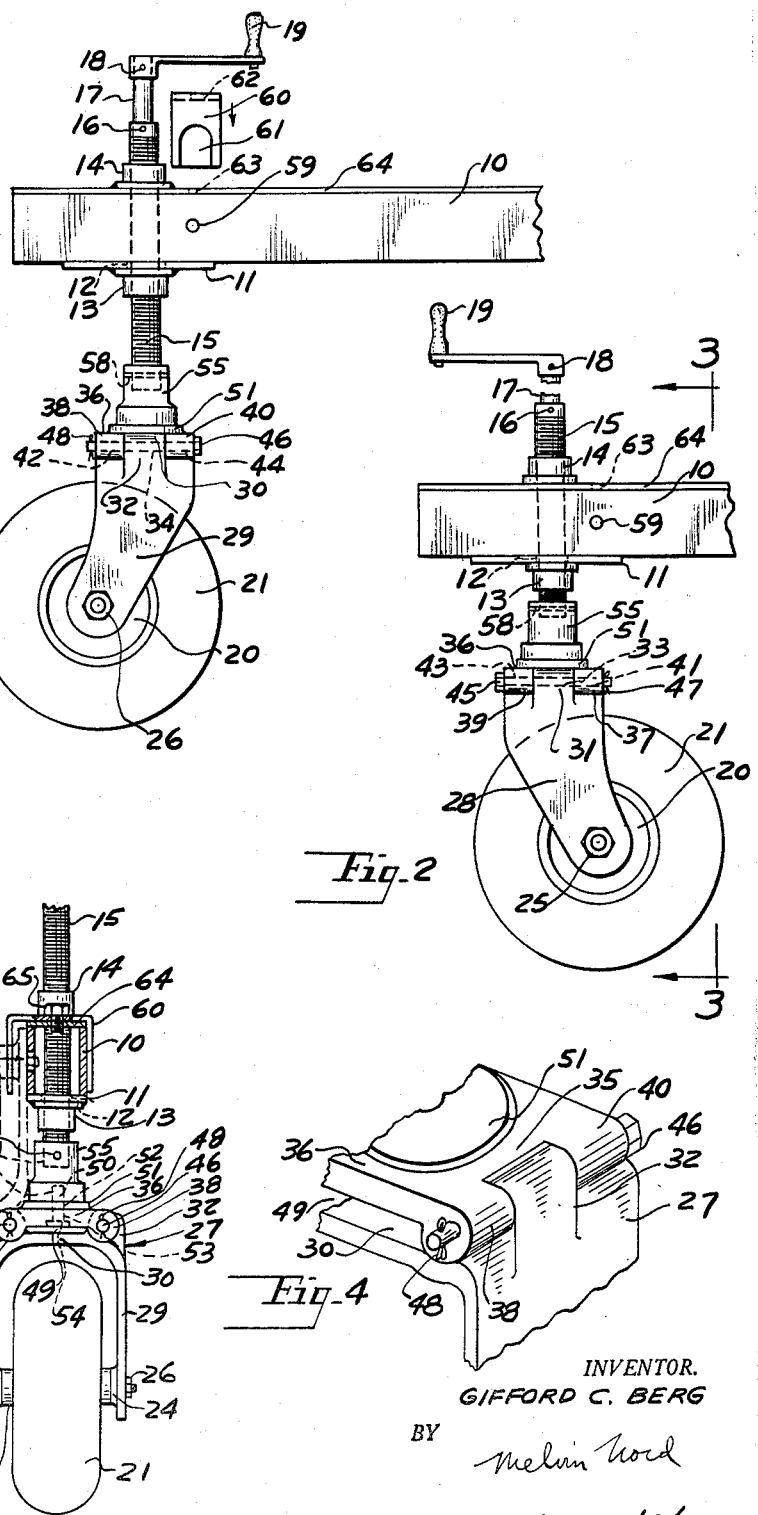
Oct. 4, 1960 — G. C. BERG — 2,954,963
TRAILER THIRD WHEEL
Filed Sept. 16, 1957
INVENTOR.
GIFFORD C. BERG
BY Melvin Nord
ATTORNEY

2,954,963

TRAILER THIRD WHEEL

Gifford C. Berg, 16770 Gilchrist, Detroit, Mich.

Filed Sept. 16, 1957, Ser. No. 684,057

4 Claims. (Cl. 254—86)

This invention relates to trailers, such as are used for supporting boats and other objects, while being towed by a motor vehicle. More specifically, it relates to a third or forward wheel for such trailers, which is adjustable so as to permit the trailer tongue to be elevated or lowered to the proper height for hitching to or unhitching from the rear of a motor vehicle, and is also retractable to an inoperative position when the trailer is to be towed.

Most boat trailers have no third wheel, and it is therefore necessary to lift them by hand to the proper height for hitching to the rear of an automobile, and also to lower them by hand to the ground, upon unhitching. In addition, in order to move the unhitched trailer, it is necessary manually to lift the front end off the ground. The weight of most boats and trailers is such that this can be done, but not without considerable effort and strain. In some cases, small wheels or casters have been used, but these are of no value when the trailer is to be moved over a sandy beach. If it is proposed to use large wheels in order to overcome this, the problem of retraction during towing becomes a problem. Even if this problem is solved, there remains the problem of lifting the trailer manually during hitching or unhitching.

So far as I am aware, there has been no commercially satisfactory solution to these problems, and as a result, most boating enthusiasts are required manually to lift and lug their trailers, thus somewhat dampening their enthusiasm, if not leading to physical injury. I have therefore addressed myself to the problem of providing a device which can be readily attached to trailers for boats or other objects, which comprises a large wheel which is easily adjustable in height with respect to the trailer tongue, which is retractable to an inoperative position, and which is rugged and inexpensive.

It is thus a principal object of this invention to provide a third wheel for a trailer which is adjustable vertically with respect to the trailer tongue, and which is also retractable to an inoperative position which offers no impediment to the towing of said trailer.

It is another object of this invention to provide a means for raising or lowering a trailer third wheel with respect to the trailer tongue, by rotation of a threaded vertical shaft within a threaded collar extending through or fastened to said trailer tongue, said wheel being rotatably mounted below said vertical shaft.

It is another object of this invention to provide a hinged mounting for a trailer third wheel, permitting said wheel to be rotated upwardly through substantially 180 degrees to an inoperative position, and to be fastened in such inoperative position during towing of said trailer.

Other objects and advantages of this invention will more fully appear from the following description, taken in conjunction with the accompanying drawings, wherein I have disclosed a preferred embodiment of the invention.

In the drawings:

Fig. 1 is a side elevation of the forward portion of a trailer, showing the trailer third wheel in an operative position;

Fig. 2 is a side elevation of the forward portion of a trailer, showing the trailer third wheel in an intermediate position, preparatory to be placed in the final inoperative position;

Fig. 3 is a sectional view, taken along the lines 3—3 of Fig. 2 showing the manner of rotating the wheel to final inoperative position; and Fig. 4 is a fragmentary perspective view of the hinging mechanism which permits rotation of the wheel upwardly to final inoperative position.

Referring now in detail to the drawings, wherein similar numerals represent similar parts, the numeral 10 represents the forward portion of a trailer tongue, which is shown in the form of a channel. Fastened below said trailer tongue 10, e.g. by welding, is a horizontal plate 11 with a circular hole 12 therethrough. Fastened below said plate 11, e.g. by welding, and aligned axially with hole 12, is a threaded collar 13. Fastened to the top of said trailer tongue 10, e.g. by welding, is a second threaded collar 14, aligned axially with the first collar 13. A threaded vertical shaft 15 runs through said collars 13 and 14. Attached to the upper end of said shaft 15, e.g. by means of a pin 16, is a rod 17, to which is attached, by means of a pin 18, a handle 19, which permits manual rotation of shaft 15 through collars 13 and 14.

A wheel 20, with a relatively large pneumatic tire 21 mounted thereon, is mounted on an axle 22 which is rotatably mounted in bearings 23, 24. Said bearings 23, 24 are fastened by nuts 25, 26 to the lower ends of a fork 27. Said fork 27 comprises two downwardly depending fork arms 28, 29 adapted to support the aforesaid wheel 20, and a top platform 30. Integral with the upper ends of said fork arms 28, 29, and intermediate the edges thereof, are a pair of upstanding longitudinal hinge lugs or ears 31, 32 with longitudinal bolt holes 33, 34 therethrough. The term "longitudinal" is used here to mean substantially parallel to the tongue 10 when the wheel 20 is in the position shown in Fig. 2, i.e. aligned parallel to the tongue 10.

Mounted above the fork 27 is a looped hinged connector 35, comprising a horizontal substantially rectangular plate 36, from the four corners of which downwardly depend lugs 37, 38, 39, 40, adapted to be aligned with the upstanding fork lugs 31, 32, and containing aligning bolt holes 41, 42, 43, 44 therethrough. Hinge bolt 45 runs through the aligned holes of lugs 31, 37, and 39, and hinge bolt 46 runs through the aligned holes of lugs 32, 38, and 40, with cotter pins 47 and 48, respectively, holding said hinge bolts in position, thus constituting the mounting for swivel hinge 35 above the top platform 30 of fork 27. A small gap 49 is left between the top of platform 30 of fork 27 and the bottom of plate 36 of the swivel-hinge 35, leaving room for the head of a vertical bolt 50, the function of which bolt is subsequently described.

A cylindrical raised platform 51 extends upwardly from the central portion of swivel-hinge 35, and a bolt hole 52 extends axially upwardly therethrough. Axially aligned therewith is a similar bolt hole 53 extending through the plate portion 36 of said swivel-hinge 35. Said hole 53 in plate 36 is preferably countersunk, as shown at 54, to accommodate at least part of the head of vertical bolt 50.

A swivel collar 55 serves as a connector between said swivel hinge 35 and the threaded shaft 15. Said swivel collar 55 rests on the raised platform 51 of the swivel hinge 35. A threaded bolt hole 56 in the lower portion of said swivel collar 55, adapted to be aligned with bolt holes 52 and 53 in raised platform 51 and plate 36, respectively, is adapted to receive the threaded end of vertical bolt 50, thus permitting the fastening of said swivel collar 55 to said swivel-hinge 35.

The upper end of swivel collar 55 contains a vertical hole 57, adapted to receive the lower end of the threaded shaft 15. Said threaded shaft 15 is fastened to said swivel collar 55 by means of a pin 58.

As shown in Fig. 3, if hinge bolt 46 is removed, so that fork lug 32 is free to be dropped out of interposition between lugs 38 and 40 of plate 36, the entire wheel mounting can be rotated, in the direction shown by the arrows, through substantially an arc of 180 degrees. At this point, the fork arm 28 will be substantially flush with the side of the tractor tongue 10, and bearing nut 25 will extend through a hole 59 in the side of said trailer tongue.

In order to maintain said wheel mounting in this inoperative position, a U-shaped clasp 60 is provided. Said clasp contains a vertical slot 61 in one side thereof, adapted to fit over axle 22, and a vertical bolt hole 62, adapted to be aligned with a threaded bolt hole 63 extending through the top plate 64 of the trailer tongue 10. A clasp bolt 65, extending through bolt hole 62 of said clasp 60, may thus be screwed into the threaded bolt holt 63 in the top plate 64 of the trailer tongue 10, thus maintaining the wheel mounting in the inoperative position shown.

Alternatively, if desired, the entire wheel mounting may be removed, by removing both hinge bolts 45 and 46, instead of only hinge bolt 46.

In operation, the handle 19 is turned in the appropriate direction to raise or lower trailer tongue 10 to the correct height for hitching to an automobile for towing. After hitching the trailer to said automobile, the handle 19 is operated to raise the wheel mounting to the predetermined position shown in Fig. 2. Hinge bolt 46 is then removed and the wheel mounting is rotated upwardly to the dotted position shown in Fig. 3. The clasp 60 and clasp bolt 65 are then applied, to fasten the wheel mounting in this inoperative position.

The method of placing the wheel mounting in operative position, for use in manual movement of the trailer, is the reverse of that described above.

Various modifications may be made in the details of construction without departing from the spirit of the invention as defined in the following claims, which are directed to the principal features of the invention rather than to the readily changeable details.

I claim:

1. A retractable trailer third wheel comprising in combination: raising and lowering means for a trailer tongue; a rotatable ground-engaging wheel, a mounting for said wheel, means swingably supporting said wheel and wheel mounting on said raising and lowering means for movement upwardly through an arc of substantially 180 degrees to inverted position, said raising and lowering means being adapted to bring said wheel and wheel mounting to a predetermined position with respect to said trailer tongue so spaced apart therefrom that upon inversion of said wheel and wheel mounting they will lie adjacent a side of said trailer tongue; and fastening means for fastening said wheel and wheel mounting, when in the aforesaid inverted position, to said trailer tongue.

2. The trailer third wheel set forth in claim 1, wherein said raising and lowering means include a vertical shaft adapted for upward and downward motion through a collar fastened to said trailer tongue, and wherein said wheel mounting is swingably mounted at the bottom of said shaft.

3. The trailer third wheel set forth in claim 1, wherein the aforesaid means for swingably supporting said wheel and wheel mounting on said raising and lowering means includes a looped hinged connector having at least one downwardly depending looped hinge lug adapted for alignment with a corresponding lug extending upwardly from said wheel mounting.

4. The trailer third wheel set forth in claim 1, wherein said wheel mounting comprises a fork having a pair of downwardly depending fork arms adapted to support said wheel and its axle rotatably and being connected together at the top thereof, and at least one longitudinal hinge lug extending upwardly from each of said fork arms; and wherein the aforesaid means for swingably supporting said wheel and wheel mounting on said raising and lowering means comprises a looped hinged connector having at least one downwardly depending looped hinge lug adapted for alignment with the aforesaid upwardly extending lugs from each of said fork arms, and a pair of hinge bolts for the aforesaid lugs, at least one of said bolts being readily removable so as to permit swinging of said wheel and wheel mounting upwardly around the other bolt into the aforesaid inverted position.

References Cited in the file of this patent

UNITED STATES PATENTS

| | | |
|---|---|---|
| 2,348,869 | Wagner | May 16, 1944 |
| 2,539,897 | Davey et al. | Jan. 30, 1951 |
| 2,608,416 | Frost | Aug. 26, 1952 |
| 2,648,092 | Esslinger | Aug. 11, 1953 |
| 2,738,543 | Van Meter | Mar. 20, 1956 |
| 2,810,588 | Rozett | Oct. 22, 1957 |

FOREIGN PATENTS

| | | |
|---|---|---|
| 510,392 | Great Britain | July 31, 1939 |